(12) United States Patent
Klug et al.

(10) Patent No.: US 12,517,224 B2
(45) Date of Patent: Jan. 6, 2026

(54) DISTANCE MEASURING SYSTEM

(71) Applicant: AUDI AG, Ingolstadt (DE)

(72) Inventors: Markus Klug, Ingolstadt (DE); Tobias Moll, Ingolstadt (DE); Johannes Scheuchenpflug, Baar-Ebenhausen (DE)

(73) Assignee: AUDI AG, Ingolstadt (DE)

( * ) Notice: Subject to any disclaimer, the term of this patent is extended or adjusted under 35 U.S.C. 154(b) by 1100 days.

(21) Appl. No.: 17/608,241

(22) PCT Filed: Apr. 30, 2020

(86) PCT No.: PCT/EP2020/062108
§ 371 (c)(1),
(2) Date: Nov. 2, 2021

(87) PCT Pub. No.: WO2020/225120
PCT Pub. Date: Nov. 12, 2020

(65) Prior Publication Data
US 2022/0206113 A1      Jun. 30, 2022

(30) Foreign Application Priority Data

May 3, 2019   (DE) .................. 10 2019 206 378.0

(51) Int. Cl.
*G01S 7/48*        (2006.01)
*G01S 7/481*       (2006.01)
(Continued)

(52) U.S. Cl.
CPC ............. *G01S 7/481* (2013.01); *G01S 17/10* (2013.01); *G01S 17/894* (2020.01)

(58) Field of Classification Search
None
See application file for complete search history.

(56) References Cited

U.S. PATENT DOCUMENTS

| 5,268,985 A | 12/1993 | Ando et al. |
| 2002/0163874 A1 | 11/2002 | Nakanishi et al. |

(Continued)

FOREIGN PATENT DOCUMENTS

| CN | 108779907 A | 11/2018 |
| CN | 109416264 A | 3/2019 |

(Continued)

OTHER PUBLICATIONS

Chinese Office Action dated Mar. 22, 2024 for parallel Chinese Application No. 202080032976.0.

(Continued)

*Primary Examiner* — Hovhannes Baghdasaryan
(74) *Attorney, Agent, or Firm* — STAAS & HALSEY LLP

(57) ABSTRACT

A light source emits light of a predefined wavelength onto a coupling-in region which has a coupling-in diffraction structure and couples the light into a carrier medium in the direction of a measurement region. The measurement region is a combination of an emission diffraction structure and a receiving diffraction structure. The emission diffraction structure extracts light which has been coupled into a measurement volume to be monitored for reflection at an object outside the carrier medium. The receiving diffraction structure couples the reflected light, which is incident on the receiving diffraction structure from outside the carrier medium, into the carrier medium in the direction of a detector region. The detector region has a detector diffraction structure that routes the light onto a detector apparatus. Then the detector apparatus determines a distance to the object from a time of flight of the light from the light source to the detector apparatus.

16 Claims, 2 Drawing Sheets

(51) Int. Cl.
  *G01S 17/10*   (2020.01)
  *G01S 17/894*   (2020.01)

(56) References Cited

U.S. PATENT DOCUMENTS

| | | |
|---|---|---|
| 2017/0205618 A1 | 7/2017 | Basset et al. |
| 2018/0106901 A1 | 4/2018 | Frederiksen et al. |
| 2018/0232048 A1 | 8/2018 | Popovich et al. |

FOREIGN PATENT DOCUMENTS

| | | |
|---|---|---|
| DE | 692 25 811 T2 | 1/1999 |
| DE | 10 2016 118 471 A1 | 3/2018 |
| DE | 10 2016 220 232 A1 | 4/2018 |
| DE | 10 2017 208 896 A1 | 11/2018 |
| EP | 0 635 729 | 6/1998 |
| WO | WO 2018/215407 A1 | 11/2018 |

OTHER PUBLICATIONS

Office Action dated Apr. 9, 2020 for German Patent Application No. 10 2019 206 378.0.
International Search Report dated Jul. 30, 2020 for International Application No. PCT/EP2020/062108.
Translation by WIPO of International Preliminary Report on Patentability for International Appl. No. PCT/EP2020/062108 dated Jul. 30, 2020.
PCT/EP2020/062108, Apr. 30, 2020, Markus Klug, AUDI AG.
10 2019 206 378.0, May 3, 2019, Markus Klug, AUDI AG.

DISTANCE MEASURING SYSTEM

CROSS REFERENCE TO RELATED APPLICATIONS

This application is a U.S. national stage of International Application No. PCT/EP2020/062108, filed on Apr. 30, 2020. The International Application claims the priority benefit of German Application No. 10 2019 206 378.0 filed on May 3, 2019. Both the International Application and the German Application are incorporated by reference herein in their entirety.

BACKGROUND

A distance measuring system may be a LIDAR system, for example. The LIDAR system ("Light Detection and Ranging") is an optical method in which a distance to an object in a spatial region or a measurement volume can be determined using a time-of-flight measurement of light pulses. Various LIDAR systems are already known which can guide the light beam into the measurement volume by optical elements and can receive a reflected light beam from the measurement volume in order to guide it to a detector apparatus. The distance measurement is based on a time-of-flight measurement of the light from the light source to the detector.

US 2018/0106901 A1 discloses a LIDAR sensor for detecting an object in the environment and a method for activating a LIDAR sensor.

DE 10 2016 220 232 A1 discloses an optical element for a LIDAR system having an expansion optical system and a projection lens, wherein the expansion optical system and/or the projection lens is/are formed by a holographic element.

The disadvantage of the known distance measuring systems is that separate optical elements must be aligned with one another and may slip as a result of a mechanical load, for example.

SUMMARY

The distance measuring system described herein is robust with respect to a mechanical load.

The distance measuring system described herein has a carrier medium which is produced from glass or plastic, for example, and is designed, as a light guide, to transmit light coupled in by internal reflection. In particular, a glass plate may be provided as the carrier medium. The carrier medium has a measurement region for emitting and receiving light, a coupling-in region and a detector region which are arranged in different sections of the carrier medium. The slipping described can be prevented by rigidly coupling the regions by the carrier medium. The distance measuring function, which may be a LIDAR function, is achieved using the light guidance as described below.

The distance measuring system described herein has a light source which is designed and arranged to emit light at a predefined wavelength onto the coupling-in region. The light source may include, in particular, an LED or a laser, such as a laser diode, which can emit light at the predefined wavelength. In this case, the predefined wavelength relates to an emission wavelength of the light source which is predefined depending on the LED or laser used. The predefined wavelength may be in an infrared wavelength range of 800 nanometers to 1000 nanometers, in particular at 850 nanometers, 905 nanometers, 1064 nanometers or 1550 nanometers.

The coupling-in region is in the form of a holographic element with a coupling-in diffraction structure and is designed to couple light at the predefined wavelength, which is incident on the coupling-in diffraction structure from the light source, into the carrier medium in the direction of the measurement region, wherein the measurement region is in the form of a combination of a holographic element with an emission diffraction structure and a holographic element with a receiving diffraction structure, wherein the emission diffraction structure is designed to couple light of the predefined wavelength which has been coupled in from the coupling-in region out of the carrier medium into a measurement volume to be monitored for reflection at an object outside the carrier medium, and wherein the receiving diffraction structure is designed to couple the reflected light of the predefined wavelength, which is incident on the receiving diffraction structure from outside the carrier medium, into the carrier medium in the direction of the detector region.

The detector region is in the form of a holographic element with a detector diffraction structure and is designed to couple light of the predefined wavelength, which has been coupled in from the measurement region and is incident on the detector diffraction structure, out of the carrier medium onto a detector apparatus, wherein the detector apparatus is designed to capture the light of the predefined wavelength which is coupled out onto the detector apparatus and to determine a distance to the object from a time of flight of the light from the light source to the detector apparatus.

In other words, light can be emitted at a predefined wavelength by a light source into a coupling-in region where it is coupled into a carrier medium by a coupling-in diffraction structure which may be a holographic element. Inside the carrier medium, the light can be transmitted to a measurement region by internal reflection, that is to say total internal reflection.

At least two holographic elements are provided in the measurement region and may each have, for example, their own diffraction structure, namely the emission diffraction structure and the receiving diffraction structure, wherein the holographic elements may be connected to one another, for example in a layered construction, by a transfer adhesive. The emission diffraction structure can couple light out of the carrier medium and can emit it onto a measurement volume which is to be monitored and in which the light can be reflected at an object and can be incident on the carrier medium again, where the receiving diffraction structure can coupled the reflected light into the carrier medium in the direction of the detector region. In the direction of the detector region here means a macroscopic direction from the measurement region to the detector region along the carrier medium or a direction vector in the propagation direction of light by internal reflection. A light path may naturally here have a zig-zag course on account of the internal reflection.

The detector region is also in the form of a holographic element with a detector diffraction structure which can diffract the light reflected by the object in the measurement volume onto a detector apparatus. The detector apparatus can then detect the arriving signal of the reflected light and can determine a distance to the object from a time of flight of the light from the light source to the detector apparatus. For this purpose, the light source can emit the light in a light pulse, in which case a time measurement can be started at the same time as the light pulse is emitted and is stopped when the light pulse arrives at the detector apparatus. The distance to the object can then be determined from this time by the speed of light and consideration of the time of flight of the light in the distance measuring system; this means that only the time of flight of the light between leaving the measurement region and re-entering the measurement region is measured.

A holographic element, which is also referred to as a holographic optical element (HOE), is an optical element, the functional principle of which is based on holography and which can be produced using holographic methods, that is to say holographic exposure. For this purpose, an interference pattern, which is produced when two coherent waves of the same wavelength are superimposed, can be recorded on a light-sensitive layer of the holographic element. This makes it possible to produce optical gratings, lenses, mirrors and beam splitters which have properties like known optical elements, but have a lower thickness.

An advantage is that the distance measuring system is more robust and more resistant to external influences, for example a mechanical load, since a more compact construction with fewer separate components can be achieved. Furthermore, less installation space is required for the distance measuring system. In addition, by virtue of the light guidance of the carrier medium, the distance measuring system could be applied to transparent and curved surfaces, for example in a window or side window or a headlight of a motor vehicle, or in a display, in particular a cellphone display.

The embodiments described herein result in additional advantages.

One embodiment provides for the coupling-in diffraction structure, the emission diffraction structure, the receiving diffraction structure and the detector diffraction structure to be in the form of an optical grating, in particular a volume holographic grating or a surface holographic grating.

Optical gratings, also called diffraction gratings, and their method of operation and production methods are generally known in this case. In principle, optical gratings may be in the form of structures which are periodic at least in certain sections, so-called grating structures, in a substrate and can guide light, as known from mirrors, lenses or prisms for example, through the physical effect of diffraction. If light, that is to say light beams, is/are incident on the optical grating, wherein the incident light beams satisfy the Bragg equation, in particular, the light beams are diffracted or deflected by the optical grating. The light can therefore be guided, in particular, by interference phenomena of the light beams diffracted by the optical grating. The deflection structure can accordingly also be referred to as a diffraction structure. A surface holographic grating and a volume holographic grating are holographic optical elements which can be produced, in particular, by holographic method.

An optical grating can be designed to be angle-selective or direction-selective and/or wavelength-selective or frequency-selective with respect to the incident light. Therefore, only light which is incident on an optical grating from a predetermined direction of incidence, for example at a predetermined angle, can be deflected. Light which is incident on the optical grating from another direction may not deflected is deflected to a lesser extent, the greater the difference from the predetermined direction of incidence. Additionally or alternatively, only light of one wavelength or light which differs from the predetermined wavelength at most by a predetermined wavelength range can also be deflected by the optical grating at a particular diffraction angle. In other words, it is possible to predefine, for example, an optimum wavelength at which only a portion of the light in a particular wavelength or frequency range around the optimum wavelength is deflected by the optical grating (for example a central optimum wavelength and a range with wavelength values up to +/−10% of the optimum wavelength); in contrast, the remaining portion of the light can propagate through the grating without being deflected. At least one monochromatic light portion can therefore be separated from polychromatic light which strikes the optical grating. The deflection effect is therefore frequency-selective and/or angle-selective, wherein the deflection effect is at a maximum for an optimum wavelength and falls or becomes weaker toward longer and shorter wavelengths, for example falls according to a Gaussian bell. In particular, the deflection effect acts only on a fraction of the visible light spectrum and/or in an angular range of less than 90 degrees.

Optical gratings can be produced by exposing a substrate, that is to say photolithographically or holographically, for example. In this context, the optical gratings can then also be referred to as holographic or holographic optical gratings. Two types of holographic optical gratings are known: surface holographic gratings (SHG for short) and volume holographic gratings (VHG for short). In the case of surface holographic gratings, the grating structure can be produced by optically deforming a surface structure of the substrate. Impinging light can be deflected, for example reflected, by the changed surface structure. Examples of surface holographic gratings are so-called sawtooth or blazed gratings. In contrast to this, in the case of volume holographic gratings, the grating structure can be incorporated in the entire volume or a section of the volume of the substrate. Surface holographic gratings and volume holographic gratings are generally frequency-selective.

Glass, e.g., quartz glass, is suitable, in particular, as the material for a substrate for incorporating an optical grating, for example. Alternatively or additionally, it is also possible to use a polymer, in particular a photopolymer, or a film, in particular a photosensitive film, for example made of plastic or an organic material. For use of such substrates, it should be additionally borne in mind that the material, in particular in substrate form, has flexible and optical-waveguiding properties. Substrates having a deflection structure for diffracting light, for example in the form of an optical grating, can also be referred to as holographic optical elements (HOE).

A further embodiment provides for the coupling-in region, the measurement region and the detector region to be formed in one piece with the carrier medium, or for the carrier medium to be in the form of an element separate from the coupling-in region, the measurement region and the detector region.

In the first case, the coupling-in region, the measurement region and the detector region may therefore be directly incorporated in a surface structure of the carrier medium, for example. The carrier medium itself may therefore be formed, for example etched or lasered, as an HOE. In the second case, the coupling-in region, the measurement region, the detector region and the carrier medium may be separate. In this case, the coupling-in region, the measurement region and the detector region may respectively form a separate element, for example, and the carrier medium may form a further element which abuts the other elements. The respective regions can therefore be formed as at least one respective HOE. This enables a greater selection when using a carrier medium. For example, the coupling-in region, the measurement region and the detector region may be formed in different sections of a holographic film or plate. In order to fasten the film or plate to the carrier medium, the film or plate may be adhesively bonded to the carrier medium. Alternatively, the holographic film may also be in the form of an adhesion film and may adhere directly, that is to say without adhesive, to the surface of the carrier medium as a result of molecular forces.

A further embodiment provides for the holographic element of the emission diffraction structure and the holographic element of the receiving diffraction structure to be connected to one another, wherein, from the point of view of the measurement volume, the receiving diffraction structure is arranged between the measurement volume and the emission diffraction structure and the receiving diffraction structure at least partially overlies the emission diffraction structure. In other words, the emission diffraction structure and the receiving diffraction structure may be in the form of two holographic elements which are connected to one another in a planar manner, in particular are adhesively bonded by a transfer adhesive, wherein the emission diffraction structure can shine the light from the light source through the receiving diffraction structure since the latter is transparent for the angle of incidence of the light from the emission diffraction structure. The reflected light in turn may be deflected by the receiving diffraction structure arranged upstream of the emission diffraction structure since the angle of incidence is sensitive here according to the grating structure of the receiving diffraction structure. The holographic elements may also be arranged with an offset with respect to one another, with the result that they now overlap only in one section. In addition, it is also possible to use more than two holographic elements, for example a layer structure of three or more holographic elements. This embodiment results in the advantage that an emission region and a receiving region may have the same design in the measurement region, as a result of which a light path outside the carrier medium to the object may be the same in the outward and return directions. In addition, it is possible to achieve a more stable design of the distance measuring system since the holographic elements are not separate, but rather are connected to one another, as a result of which it is difficult to shift the emission diffraction structure and the receiving diffraction structure.

A further embodiment provides for the coupling-in region and the detector region to have a smaller dimension than the measurement region, wherein the coupling-in diffraction structure has a scattering grating structure which is designed to deflect light beams of the light, which is incident on the coupling-in diffraction structure, to different extents depending on a location of incidence, with the result that the coupling-in diffraction structure fans out or scatters the light beams onto the emission diffraction structure, and wherein the receiving diffraction structure has a focusing grating structure which is designed to deflect the reflected light, which is incident on the receiving diffraction structure from outside the carrier medium, to different extents depending on the location of incidence, with the result that the receiving diffraction structure focuses the light beams onto the detector diffraction structure, and wherein the detector diffraction structure has a corresponding scattering diffraction structure which is designed to parallelize light beams of the light for coupling out of the carrier medium onto the detector apparatus. In other words, a mapping of the coupling-in region to a dimension of the measurement region can be increased and a mapping of the measurement region to a dimension of the detector region can be reduced, thus making it possible to form an expansion optical system or a collimation optical system by the diffraction structures.

A focusing grating structure may have an inhomogeneous diffraction structure which can diffract light beams from an edge of the diffraction structure to a greater extent than light beams from a center of the diffraction structure, for example, as a result of which the light beams can be focused. Accordingly, a scattering grating structure may have a grating structure in which light beams can be fanned out depending on the impinging position. In this embodiment, the focusing grating structure and the scattering grating structure and the corresponding distances between the two structures may be selected in such a manner that the light beams converge from the focusing grating structure to the scattering grating structure and are parallelized again by the scattering grating structure or alternatively diverge from the scattering grating structure to the focusing grating structure and are parallelized or focused again by the focusing grating structure. This arrangement is comparable to a Galilean telescope in which a converging lens and a diverging lens are arranged in series in such a manner that the focal lengths of the two lenses coincide at a point downstream of the diverging lens. This embodiment results in the advantage that a detector which is small in comparison with the measurement region can be used for the detector apparatus and there is no need for any complicated beam expansion in the coupling-in region, thus making it possible to save costs.

A further embodiment provides for the emission diffraction structure to have a focusing grating structure and/or a scattering grating structure which are each designed to deflect different light beams of the light, which is incident on the emission diffraction structure, to different extents depending on the location of incidence. This means that a different angular change of the respective light beams of the light can be achieved depending on the location of incidence; for example, external light beams can be deflected at a greater angle than internal light beams with respect to an optical axis. In particular, provision may be made for interaction of the coupling-in diffraction structure with the emission diffraction structure to parallelize the light beams for coupling out of the carrier medium, to fan them out or to focus them on a focal point. The emission diffraction structure may also have a plurality of regions which each have one of the grating structures, as a result of which the emission diffraction structure may also have a focusing grating structure and a scattering grating structure. This embodiment results in the advantage that different emission characteristics can be generated and, for example, a large measurement volume can be scanned by a beam which has been fanned out or an object in the measurement volume can be scanned more accurately by a focused light beam.

Provision may be made for the emission diffraction structure to be divided into predefined subregions which may have a different size for example, wherein the predefined subregions differ in terms of the focusing grating structure or scattering grating structure provided in order to deflect the light beams of the light for coupling out of the carrier medium to different extents in certain regions depending on the location of incidence in order to define an emission characteristic. For example, it is therefore possible to achieve the situation in which predefined subregions of the emission diffraction structure focus the light beams in order to produce finer scanning of the measurement volume and predefined subregions may fan out the light beams in an emission region in order to produce large-area scanning. This embodiment results in the advantage that different emission characteristics can be defined in order to scan regions of a measurement volume with different accuracy. For example, provision may be made for a central subregion to be designed to carry out finer scanning and for outer subregions to be designed to carry out coarser scanning.

One embodiment provides for the detector apparatus to have a photodiode matrix, wherein the photodiode matrix is designed to assign the light coupled out onto the detector apparatus in accordance with an entry position to the measurement region and/or an angle of incidence on the measurement region. In other words, it is possible to provide a photodiode matrix which may be, in particular, a photomixing detector (PMD sensor) and, in a similar manner to a photo camera, can assign the light according to the entry position to the measurement region, that is to say the photodiode matrix can simultaneously determine a distance for each photodiode of the photodiode matrix. Alternatively or additionally, provision may also be made for the entry angle to the measurement region to be assigned in the photodiode matrix. As a result of the angle selectivity of the receiving diffraction structure, provision may be made, for example, for only light which enters the measurement region at a particular angle to be coupled into the carrier medium and therefore the detector apparatus. This means that the receiving diffraction structure acts as a collimator which forwards only predefined entry angles. For example, the photodiode matrix may be in the form of a matrix of CCD or CMOS sensors. This embodiment results in the advantage that it is possible to determine an item of location and distance information over an entire measurement volume using light pulse emission. It is therefore possible to implement a TOF (time-of-flight) camera which can record an entire distance scenario at once. The TOF camera thus provided can be used to recognize gestures in front of a display or a window, in which the distance measuring system can be installed.

The described embodiments may be combined.

BRIEF DESCRIPTION OF THE DRAWINGS

Exemplary embodiments are described below. In this respect, in the drawings.

DETAILED DESCRIPTION

Figure 1:
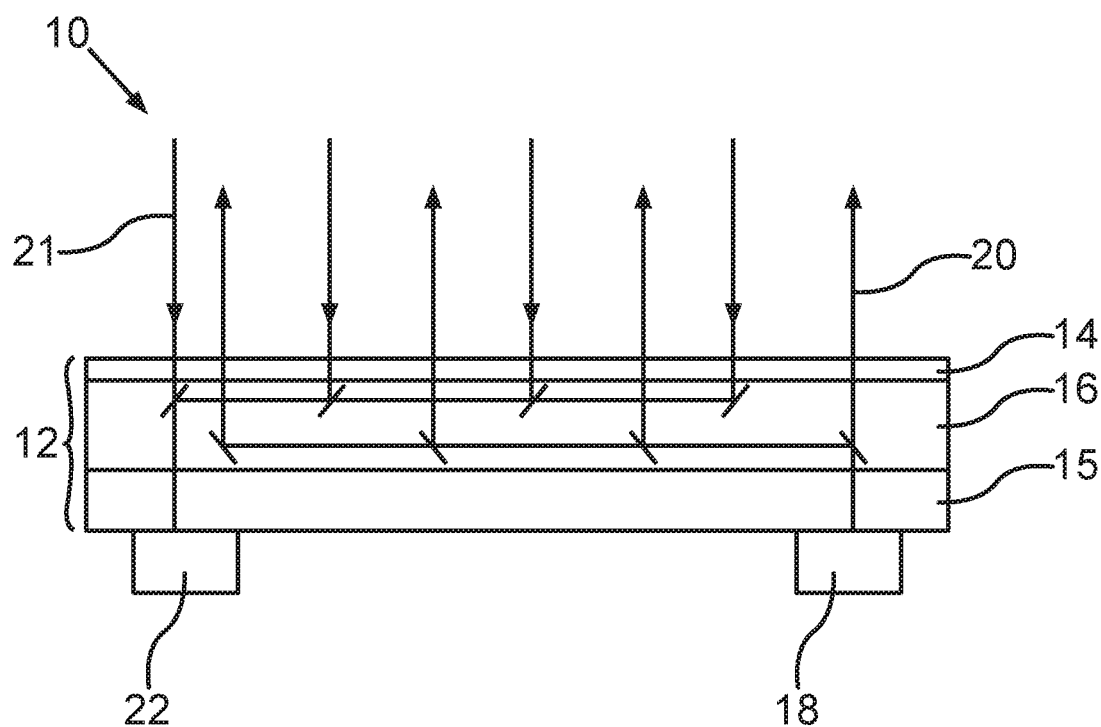
FIG. 1 is a schematic side view of one exemplary embodiment.

Reference will now be made in detail to the preferred embodiments, examples of which are illustrated in the accompanying drawings, wherein like reference numerals refer to like elements throughout.

In the exemplary embodiments explained below, the described components of the embodiments are each individual features which should be considered independently of one another and also each develop the invention independently of one another. Therefore, the disclosure is also intended to include combinations of the features of the embodiments other than those described. Furthermore, the described embodiments can also be supplemented with further features which have already been described.

In the figures, identical reference signs each denote functionally identical elements.

FIG. 1 illustrates an overview illustration of a distance measuring system 10 according to one exemplary embodiment. The distance measuring system 10 may be in the form of a LIDAR system or a TOF camera, for example. The distance measuring system 10 may have a carrier medium 12 which is produced, for example, by a layered construction, wherein a first layer may include a glass plate 14 and a second layer may include one or more holographic elements 16 which may be a photopolymer film, for example. The at least one holographic element 16 may be adhesively bonded to the glass plate 14 or incorporated in the latter. In addition, a second glass plate 15 may surround the at least one holographic element 16 as a further covering layer.

The distance measuring system 10 may have a light source 18 which may be in the form of a laser diode, for example, and can emit light into the carrier medium 12. In the carrier medium 12, the light emitted by the light source 18 may be deflected by diffraction and may therefore be distributed in a planar manner over the carrier medium 12 and may be coupled out of the carrier medium 12 by a further diffraction structure, which is illustrated by the light beams 20 which have been coupled out. These light beams 20 which have been coupled out can be emitted in a planar manner into a measurement volume to be monitored for reflection at an object (not shown) outside the carrier medium. After reflection at the object, the light beams can enter the carrier medium 12 again as reflected light 21.

In the carrier medium 12, a further diffraction structure can then guide the reflected light to a detector apparatus 22 which may have a photodiode and may detect the arrival of the light as an electronic signal. In particular, a time of flight of the light from emission by the light source 18 to the detection by the detector apparatus 22 can be measured in order to determine a distance to the object therefrom. In particular, a time delay which may be produced by a light path inside the carrier medium 12 can be subtracted in this case.

Figure 2:
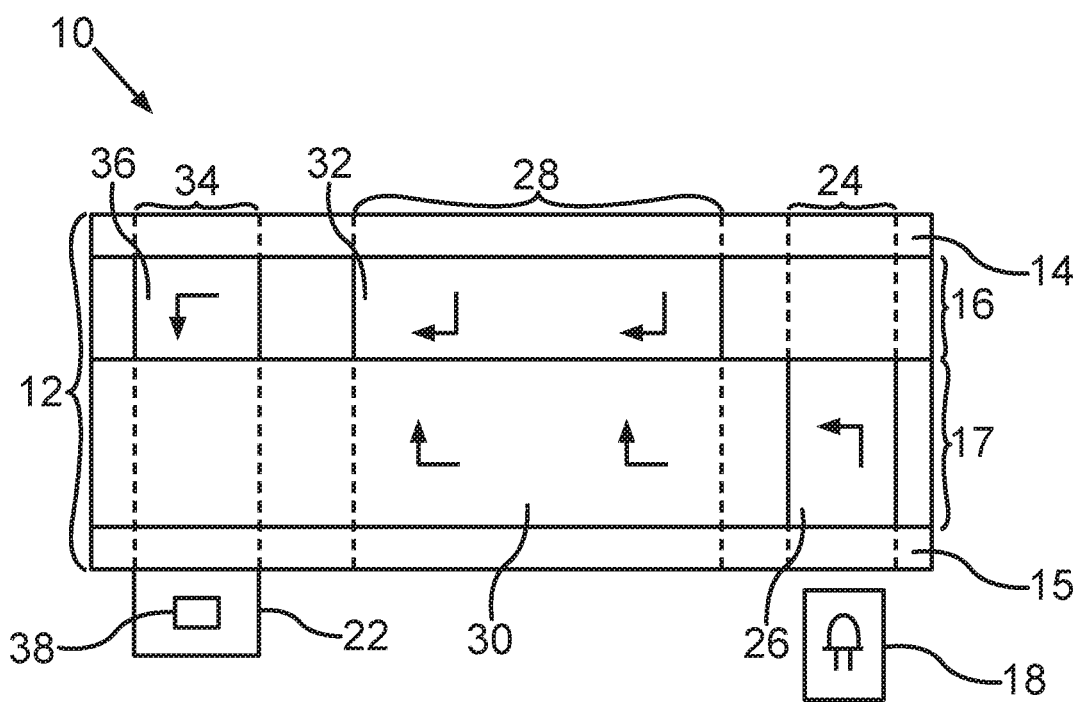
FIG. 2 is a schematic side view illustrating a method of operation of one exemplary embodiment.

The schematic illustration of the distance measuring system 10 shown in FIG. 2 is intended to be used to explain a method of operation of the distance measuring system 10 in more detail on the basis of the exemplary embodiment shown here. In FIG. 2, the distance measuring system 10 is designed with a carrier medium 12, a light source 18 and a detector apparatus 22. The carrier medium 12, which may be in the form of a light guide and can transmit light which has been coupled in by internal reflection, may have two glass plates 14, 15 as planar covering layers for a holographic element 16 and a further holographic element 17, in a comparable manner to the exemplary embodiment from FIG. 1. Alternatively, however, provision may also be made for a light-guiding plastic to be used instead of the glass plates.

The holographic element 16 may include a photopolymer film, for example, and may be connected to the glass plate 14 via an adhesive bond. Furthermore, the holographic element 17 may be connected to the glass plate 15 via an adhesive bond and the two holographic elements 14 and 15 may be connected to one another via a transfer adhesive. The thickness of the holographic elements 16, 17 may be less than 1 millimeter and the dimensions illustrated here are selected only for the purpose of illustrating the example.

The holographic element 17 may be formed in a coupling-in region 24 in such a manner that the result is a coupling-in diffraction structure 26 which may be a surface holographic grating, for example, and can couple the light from the light source 18 into the carrier medium 12 in the direction of a measurement region 28, which is indicated by the arrow from the bottom to the top with a tip to the left in the coupling-in diffraction structure 26. The holographic element 17 may likewise be formed in the measurement region 28 with an emission diffraction structure 30 which may be in the form of a volume holographic grating, for example, and can couple the light from the coupling-in region 24 out of the carrier medium 12, wherein the light which has been coupled out can shine through the holographic element 16 arranged above in the direction of an object to be measured, which is indicated by the arrows from right to left with a tip going up. The holographic element 16 which is arranged above and has a receiving diffraction structure 32, which may be in the form of a volume holographic grating for example, may be transparent in this case for the light coming from the direction of the emission diffraction structure since an entry angle to the holographic element 16 does not satisfy an angle condition for deflection by the holographic element 16.

In particular, the receiving diffraction structure 32 may be formed in the measurement region 28 in such a manner that only light which has a particular angle of incidence on the measurement region 28, in particular from a region outside the carrier medium 12, is deflected. That is to say, the receiving diffraction structure 32 may be angle-selective and couples only entry angles of plus or minus one degree from a predefined entry direction into the carrier medium 12, for example. This makes it possible to produce an optical collimator which only allows light beams into the carrier medium 12 which impinge on the measurement region 28 in a perpendicular manner, for example.

Consequently, the light which has been coupled out can be reflected, for example, by an object outside the carrier medium 12 and can be incident on the measurement region 28 again, where it can then be coupled back into the carrier medium 12 in the direction of a detector region 34 by the receiving diffraction structure 32, as indicated by the arrows from the top to the bottom with a tip on the left in the receiving diffraction structure 32.

In the detector region 34, the holographic element 16 may be formed in such a manner that a detector diffraction structure 36, which is in the form of a surface holographic grating for example, can couple the reflected light out of the carrier medium 12 in the direction of the detector apparatus 22 where a time of flight of the light from the light source 18 to the detector apparatus 22 can then be determined. In this case, the detector apparatus 22 may have a photodiode matrix 38 which can assign the light coupled out onto the detector apparatus 22 according to an entry position of the reflected light to the measurement region, in a similar manner to a photo camera. For example, a light beam which is incident on a corner of the measurement region and therefore on a corner of the receiving diffraction structure 32 can be guided to a corresponding corner of the photodiode matrix 38, as a result of which it is possible to determine a time of flight for each reflected light beam which is reflected back to the receiving diffraction structure 32, from which time of flight a three-dimensional distance image can be determined.

The coupling-in region 24, the measurement region 28 and the detector region 34 may be formed in one piece with the carrier medium 12. Alternatively, however, provision may also be made for the carrier medium 12 to be in the form of an element which is separate from the coupling-in region 24, the measurement region 28 and the detector region 34.

The coupling-in region 24 and the detector region 34 may have, in particular, a smaller dimension than the measurement region 28. For this purpose, the coupling-in diffraction structure 26 may have a scattering grating structure which can deflect light beams of the light from the light source 18 to different extents depending on a location of incidence on the coupling-in diffraction structure 26, with the result that the coupling-in diffraction structure 26 couples the light beams into the carrier medium 12 in such a manner that they are fanned out onto the emission diffraction structure 30. The receiving diffraction structure may likewise have a focusing grating structure which deflects light beams of the reflected light from outside the carrier medium 12 to different extents depending on the location of incidence on the receiving diffraction structure 32, with the result that the light beams are focused toward the detector diffraction structure 36. The detector diffraction structure 36 may have a scattering diffraction structure which matches the focusing grating structure of the receiving diffraction structure 32 and can parallelize the light beams of the reflected light for coupling out of the carrier medium 12 onto the detector apparatus 22.

Depending on the configuration of the distance measuring system 10, the emission diffraction structure 30 may have a focusing grating structure and/or a scattering grating structure which, depending on the configuration of an emission characteristic and interaction with the coupling-in diffraction structure 26, can parallelize the light beams for coupling out of the carrier medium 12, can fan them out or can focus them on a focal point.

Figure 3:
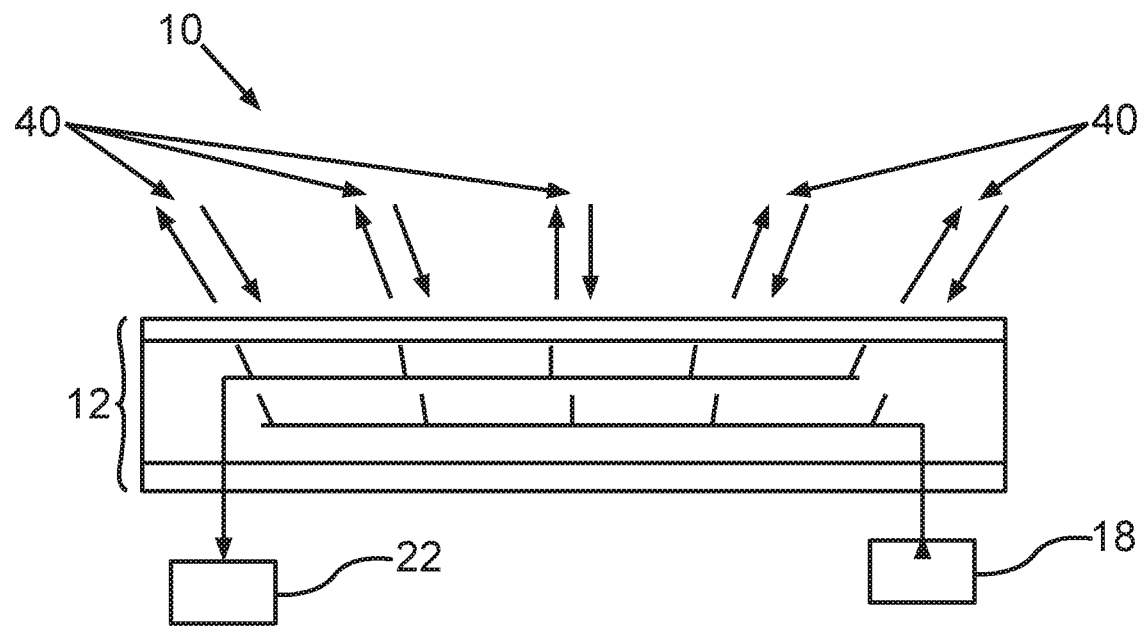
FIG. 3 is a schematic side view according to one exemplary embodiment.

FIG. 3 shows such exemplary fanning-out of light beams. In this case, light beams from the light source 18 can be fanned out onto the emission diffraction structure 30 via the coupling-in diffraction structure 26, wherein the emission diffraction structure 30 may have, for example, a further scattering diffraction structure which fans out the light beams of the light for coupling out of the carrier medium 12 onto a measurement volume to be monitored and can therefore cover a wide monitoring region. The receiving diffraction structure 32 may be designed accordingly, with the result that it allows only one angle of incidence of the light beams for coupling into the carrier medium 12 in the direction of the detector apparatus 22, which light beams have the same angle of incidence as the emission direction, which is indicated by the double-headed arrows 40.

Figure 4:
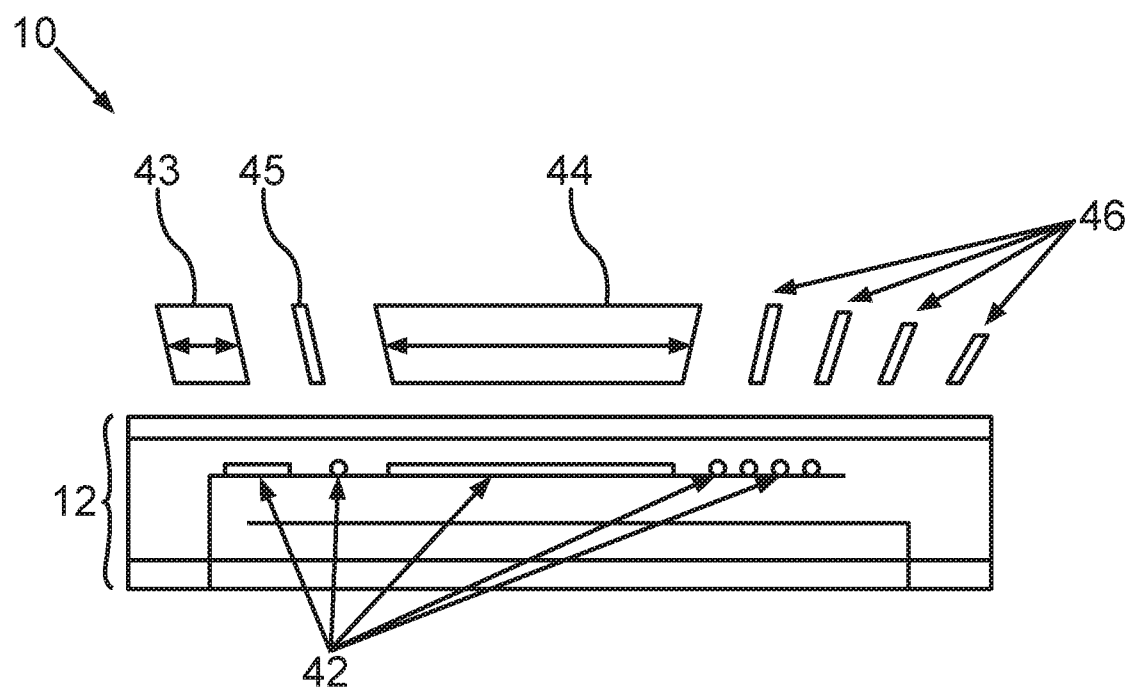
FIG. 4 is a schematic side view according to a further exemplary embodiment.

FIG. 4 illustrates a distance measuring system 10 according to a further exemplary embodiment. In this case, the carrier medium 12 may be formed in a similar manner to the carrier medium 12 in FIG. 2. However, the emission diffraction structure 38 can be subdivided into predefined subregions 42 which may have a different size, in particular, and wherein the predefined subregions 42 may differ in terms of the grating structure provided for each subregion. For example, certain regions may have a scattering grating structure and other subregions may have a focusing grating structure, as a result of which the light beams of the light for coupling out of the carrier medium 12 are deflected to different extents in certain regions. This makes it possible to produce a predetermined emission characteristic. For example, subregions may fan out the light beams, as a result of which a wide region having a low resolution is scanned, for example regions 43 and 44; however, it is also possible to provide regions which have a focusing grating structure and can scan a narrow region at a high scanning rate, for example regions 45 and 46.

Overall, the examples show how to provide a distance measuring system, in particular in LIDAR or a TOF camera, using a holographic optical element.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A distance measuring system for measuring light reflected by an object in a measurement volume outside the distance measuring system, comprising:
a light source that emits light at a predefined wavelength;
a carrier medium providing a light guide to transmit the light by internal reflection, having a measurement region emitting and receiving the light, a coupling-in region receiving the light emitted by the light source, and a detector region, the coupling-in, measurement and detector regions being arranged in different sections of the carrier medium,
the coupling-in region including a first holographic element with a coupling-in diffraction structure that supplies the light at the predefined wavelength, incident on the coupling-in diffraction structure and emitted from the light source onto the carrier medium, to the measurement region,
the measurement region including a second holographic element with an emission diffraction structure and a third holographic element with a receiving diffraction structure, the emission diffraction structure configured to route the light of the predefined wavelength, supplied by the coupling-in region, out of the carrier medium into the measurement volume to be measured for reflection from the object outside the carrier medium, and the receiving diffraction structure configured to route the reflected light of the predefined wavelength, incident on the receiving diffraction structure from outside the carrier medium, through the carrier medium to the detector region, and
the detector region including a fourth holographic element with a detector diffraction structure configured to route the light of the predefined wavelength from the measurement region through the detector diffraction structure and out of the carrier medium; and
a detector apparatus configured to capture the light of the predefined wavelength emitted by the detector region and determine a distance to the object from a travel time of the light from the light source to the detector apparatus, wherein the detector apparatus comprises a photodiode matrix configured to guide the light received by the detector apparatus in accordance with one of an entry position at the measurement region and an entry angle to the measurement region.

2. The distance measuring system as claimed in claim 1, wherein the coupling-in diffraction structure, the emission diffraction structure, the receiving diffraction structure and the detector diffraction structure are formed by one of a volume holographic grating and a surface holographic grating.

3. The distance measuring system as claimed in claim 2, wherein the coupling-in region, the measurement region and the detector region are formed in one piece with the carrier medium.

4. The distance measuring system as claimed in claim 2, wherein the carrier medium is separate from the coupling-in region, the measurement region and the detector region.

5. The distance measuring system as claimed in claim 2, wherein the second holographic element with the emission diffraction structure and the third holographic element with the receiving diffraction structure are connected to one another, and
wherein the receiving diffraction structure is arranged between the measurement volume and the emission diffraction structure and at least partially overlaps the emission diffraction structure.

6. The distance measuring system as claimed in claim 5, wherein the coupling-in region and the detector region have a smaller dimension than the measurement region,
wherein the coupling-in diffraction structure has a first scattering grating structure configured to deflect light beams of the light, incident on the coupling-in diffraction structure, to different extents depending on a location of incidence to distribute the light beams around the emission diffraction structure,
wherein the receiving diffraction structure has a first focusing grating structure configured to deflect received light, incident on the receiving diffraction structure from outside the carrier medium, to different extents depending on the location of incidence to focus the light beams onto the detector diffraction structure, and
wherein the detector diffraction structure has a corresponding scattering diffraction structure configured to align the light beams substantially in parallel in the light emitted from the carrier medium onto the detector apparatus.

7. The distance measuring system as claimed in claim 6, wherein the emission diffraction structure has at least one of a second focusing grating structure and a second scattering grating structure configured to deflect different light beams of the light, incident on the emission diffraction structure, to different extents depending on the location of incidence.

8. The distance measuring system as claimed in claim 7, wherein the emission diffraction structure is divided into predefined subregions, differing in focusing and scattering of the light beams of the light emitted from the carrier medium to different extents depending on the location of incidence, thereby defining an emission characteristic.

9. The distance measuring system as claimed in claim 8, wherein the photodiode matrix comprises a photomixing detector.

10. The distance measuring system as claimed in claim 1, wherein the coupling-in region, the measurement region and the detector region are formed in one piece with the carrier medium.

11. The distance measuring system as claimed in claim 1, wherein the carrier medium is separate from the coupling-in region, the measurement region and the detector region.

12. The distance measuring system as claimed in claim 1, wherein the second holographic element with the emission diffraction structure and the third holographic element with the receiving diffraction structure are connected to one another, and
wherein the receiving diffraction structure is arranged between the measurement volume and the emission diffraction structure and at least partially overlaps the emission diffraction structure.

13. The distance measuring system as claimed in claim 1, wherein the coupling-in region and the detector region have a smaller dimension than the measurement region,
wherein the coupling-in diffraction structure has a scattering grating structure configured to deflect light beams of the light, incident on the coupling-in diffraction structure, to different extents depending on a location of incidence to distribute the light beams around the emission diffraction structure,
wherein the receiving diffraction structure has a focusing grating structure configured to deflect received light, incident on the receiving diffraction structure from outside the carrier medium, to different extents depending on the location of incidence to focus the light beams onto the detector diffraction structure, and wherein the detector diffraction structure has a corresponding scattering diffraction structure configured to align the light beams substantially in parallel in the light emitted from the carrier medium onto the detector apparatus.

14. The distance measuring system as claimed in claim 1, wherein the emission diffraction structure has at least one of a focusing grating structure and a scattering grating structure configured to deflect different light beams of the light, incident on the emission diffraction structure, to different extents depending on the location of incidence.

15. The distance measuring system as claimed in claim 1, wherein the emission diffraction structure is divided into predefined subregions, differing in focusing and scattering of the light beams of the light emitted from the carrier medium to different extents depending on the location of incidence, thereby defining an emission characteristic.

16. The distance measuring system as claimed in claim 1, wherein the photodiode matrix comprises a photomixing detector.

* * * * *